United States Patent [19]
Bundo et al.

[11] Patent Number: 4,964,497
[45] Date of Patent: Oct. 23, 1990

[54] WORKING METHOD AND APPARATUS FOR WORKPIECE BEING CONVEYED

[75] Inventors: Isao Bundo; Kouzou Hannuki; Mikiya Ito, all of Sayama, Japan

[73] Assignee: Honda Giken Kogyo Kabushiki Kaisha, Tokyo, Japan

[21] Appl. No.: 382,446

[22] Filed: Jul. 20, 1989

[30] Foreign Application Priority Data

Jul. 22, 1988 [JP] Japan .................. 63-183358

[51] Int. Cl.$^5$ ............................ B65O 43/00
[52] U.S. Cl. ..................... 198/341; 29/429; 29/824; 198/376; 198/395; 198/401; 198/346.2
[58] Field of Search .............. 198/341, 345, 375, 376, 198/346.2, 468.2, 401, 411, 395, 399; 901/7; 29/429, 430, 711, 822–824

[56] References Cited

U.S. PATENT DOCUMENTS

| | | | |
|---|---|---|---|
| 4,589,184 | 5/1986 | Asano et al. | 29/430 |
| 4,589,199 | 5/1986 | Ohtaki et al. | 29/430 X |
| 4,627,158 | 12/1986 | Mitoh | 29/824 X |
| 4,646,915 | 3/1987 | Ohtaki et al. | 198/345 |
| 4,693,358 | 9/1987 | Kondo et al. | 198/341 X |
| 4,700,472 | 10/1987 | Muranaka | 29/822 |
| 4,723,356 | 2/1988 | Sakamoto et al. | 198/341 X |
| 4,799,581 | 1/1989 | Fujii | 198/341 |
| 4,856,701 | 8/1989 | Pöckl | 29/822 X |

FOREIGN PATENT DOCUMENTS

61-137434 8/1986 Japan .

Primary Examiner—Joseph E. Valenza
Assistant Examiner—D. Glenn Dayoan
Attorney, Agent, or Firm—Armstrong, Nikaido, Marmelstein, Kubovcik & Murray

[57] ABSTRACT

A working apparatus for a work being conveyed wherein a movable base is provided alongside of a conveyor conveying a plate-like workpiece mounted on a carrier in such a manner that the workpiece is held in an upright posture with its side surfaces facing sideward, the movable base being movable in the longitudinal direction in which the workpiece is conveyed, and a robot mounted on the movable base is used to apply predetermined working to the workpiece being conveyed by the conveyor. A clamping device for clamping the carrier is provided on the movable base and operated by signals from a detecting device that detects the carrier. A positioning mechanism is also provided on the movable base, for positioning the workpiece on the carrier in three orthogonal directions with respect to the movable base and holding the workpiece in that position. The positioning mechanism includes a vertically movable lifter for pushing the workpiece up from below to a predetermined position, a first unit having a reference seat for receiving one of the front and rearward side edges of the workpiece and a first clamp member for clamping the one side edge from sideward direction and a second unit having an abutment seat for contacting the other of the front and rearward side edges of the workpiece and a second clamp member for clamping the other side edge from sideward direction. The first unit is mounted on the movable base to be movable laterally toward and away from the conveyor. The second unit is also mounted on the movable base to be movable laterally toward and away from the conveyor and additionally movable in the longitudinal direction.

4 Claims, 6 Drawing Sheets

WORKING METHOD AND APPARATUS FOR WORKPIECE BEING CONVEYED

BACKGROUND OF THE INVENTION

This invention relates to a working method and a working apparatus, each for a workpiece being conveyed wherein a movable base is provided alongside of a conveyor conveying a workpiece such as a vehicle door or the like mounted on a carrier. The base is movable in the longitudinal direction in which the workpiece is being conveyed. A robot mounted on the movable base is used to apply predetermined working to the workpiece being conveyed by the conveyor.

An apparatus of this kind is known from the Japanese Unexamined Utility Model Registration Application Publication No. JIKKAISHO No. 61-137434 wherein a clamp means is provided on a movable base, the clamp means being movable in the longitudinal direction and operated to clamp a carrier by signals from a detecting means that detects the carrier. The clamp means having clamped the carrier is then advanced as it follows the carrier until the workpiece mounted on the carrier is moved to attain a predetermined positional relationship with respect to the movable base. Then the clamp means is fixed to the movable base and the movable base is advanced synchronously with the carrier. In this condition, a predetermined working is applied to the workpiece by the robot mounted on the movable base.

In the working apparatus arranged as above, while it is possible to obtain a predetermined positional relationship between the workpiece and the robot relative to the longitudinal direction of the conveyor, there is no guarantee that there can be obtained a predetermined positional relationship therebetween with respect to the lateral and vertical directions, so that more working errors are likely to occur due to vertical and/or lateral positional misalignments of the workpiece with respect to the robot.

In this case, if it is arranged such that the workpiece may be properly positioned vertically and laterally with respect to the carrier and supported in that position, the workpiece will then be properly positioned vertically and laterally, through the carrier, with respect to the movable base, that is, with respect to the robot mounted on the movable base, when the carrier is clamped by the clamping means.

This arrangement can eliminate occurrence of such a problem as the one just mentioned above. However, it does have a significant drawback in that a number of positioning members have to be mounted on the carrier with the result that equipment cost per carrier is much increased and in addition workability with respect to setting the workpiece onto the carrier becomes poor, thus hampering further productivity improvement.

In view of the foregoing, the object of the present invention is to provide a working method and a working apparatus, each for a workpiece being conveyed, wherein the workpiece can be accurately positioned in three orthogonal directions with respect to the robot while being conveyed even when the workpiece is not previously mounted on the carrier according to specific positioning requirements.

SUMMARY OF THE INVENTION

To achieve the above object, the present invention provides a working apparatus for a workpiece being conveyed in which a movable base is provided alongside of a conveyor conveying a workpiece mounted on a carrier which is movable in the longitudinal direction in which said workpiece is conveyed, and a robot mounted on the movable base, is used to apply predetermined working to the workpiece being conveyed by the conveyor, said apparatus further having on the movable base a clamping means operated by signals from a detector detecting the carrier for clamping the carrier, and a positioning means for positioning the workpiece on the carrier in three orthogonal directions with respect to the movable base.

Further, when the workpiece is a plate-like one and mounted on the carrier an upright posture as it is conveyed, it is preferable to have the apparatus arranged such that a positioning means mounted on the movable base comprises a vertically movable lifter for pushing the work up from below to a predetermined position, a first unit having a reference seat for receiving one of the front and rearward side edges of the work and a first clamp member for clamping the one side edge from sideward direction, and a second unit having an abutment seat for contacting the other of the front and rearward side edges of the work and a second clamp member for clamping the other side edge from sideward direction, the first unit being mounted on the movable base in such a manner that it may be movable laterally toward and away from the conveyor and the second unit being also mounted on the movable base in such a manner that it may be movable laterally toward and away from the conveyor and additionally movable in the longitudinal direction, while the clamping means for clamping the carrier is mounted on the movable base in such a manner that it may be movable longitudinally toward and away from the first unit.

As the carrier reaches the position where the movable base is disposed, the detecting means detects the carrier and the clamping means operates with signals from the detecting means and clamps the carrier. Then, the movable base together with the carrier moves forward while the positioning means is operated to position the workpiece on the carrier in three orthogonal directions with respect to the movable base and support it in that position, so that the workpiece is accurately positioned in three orthogonal directions with respect to the robot on the movable base. While moving the movable base forward synchronously with the carrier in this condition, the robot is operated to apply predetermined working to the workpiece.

When the positioning means is arranged to comprise, as described in the foregoing, the lifter, the first unit and the second unit, the clamping means is first operated to clamp the carrier and thereafter the first and the second units are moved in the lateral direction toward the conveyor side to cause the reference seat of the first unit and the abutment seat of the second unit to face each other over the plate-like workpiece mounted in an upright posture on the carrier. Next, the second unit is moved longitudinally one way toward the first unit to have the workpiece on the carrier clamped between the reference seat and the abutment seat for longitudinal positioning thereof.

When the work is longitudinally out of positional alignment with respect to the carrier to a large extent, it is very likely that, as the first and the second units are advanced toward the conveyor side, one of the units comes to interfere with the workpiece and makes the positioning impossible.

To deal with such a case, the clamping means is arranged to be movable in the longitudinal direction toward and away form the first unit. When the clamping means is moved away from the first unit for clamping the carrier and, in this condition, the first unit is advanced toward the conveyor side, enough space can be retained in the longitudinal direction between the workpiece and the first unit for preventing such interference with the workpiece. Then, as the clamping means is moved in the direction for the clamping means to get closer to the first unit, the movable base is moved by reaction with respect to the carrier and thus causes the first unit to get closer to the workpiece on the carrier. Thereafter, by advancing the second unit toward the conveyor side and thus moving it toward the first unit side, the workpiece is accurately positioned in the longitudinal direction.

As described in the foregoing, after the workpiece is positioned longitudinally with respect to the movable base, the lifter is moved upwards to move the workpiece upwards to the predetermined position and then the front and rearward side edges of the work are clamped from sideward direction by means of the first and second clamp members of the first and the second units, thus positioning the work vertically and laterally. In this manner, the workpiece is positioned in three orthogonal directions including the longitudinal, vertical and lateral directions with respect to the movable base and supported in that position.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

An embodiment of the present invention in which a sealing operation is performed on a vehicle door which is the workpiece being conveyed in this example will now be explained with reference to the accompanying drawings.

Figure 1:
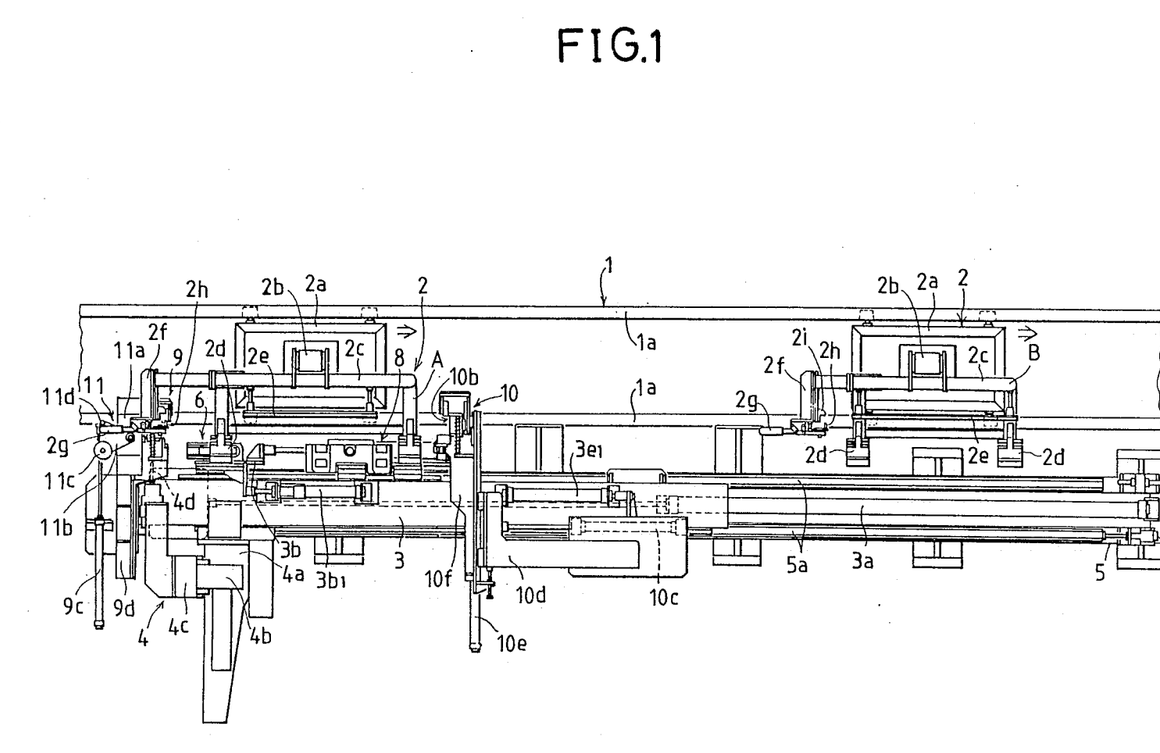
FIG. 1 is an overall top plan view of an apparatus according to the present invention.
Figure 2:
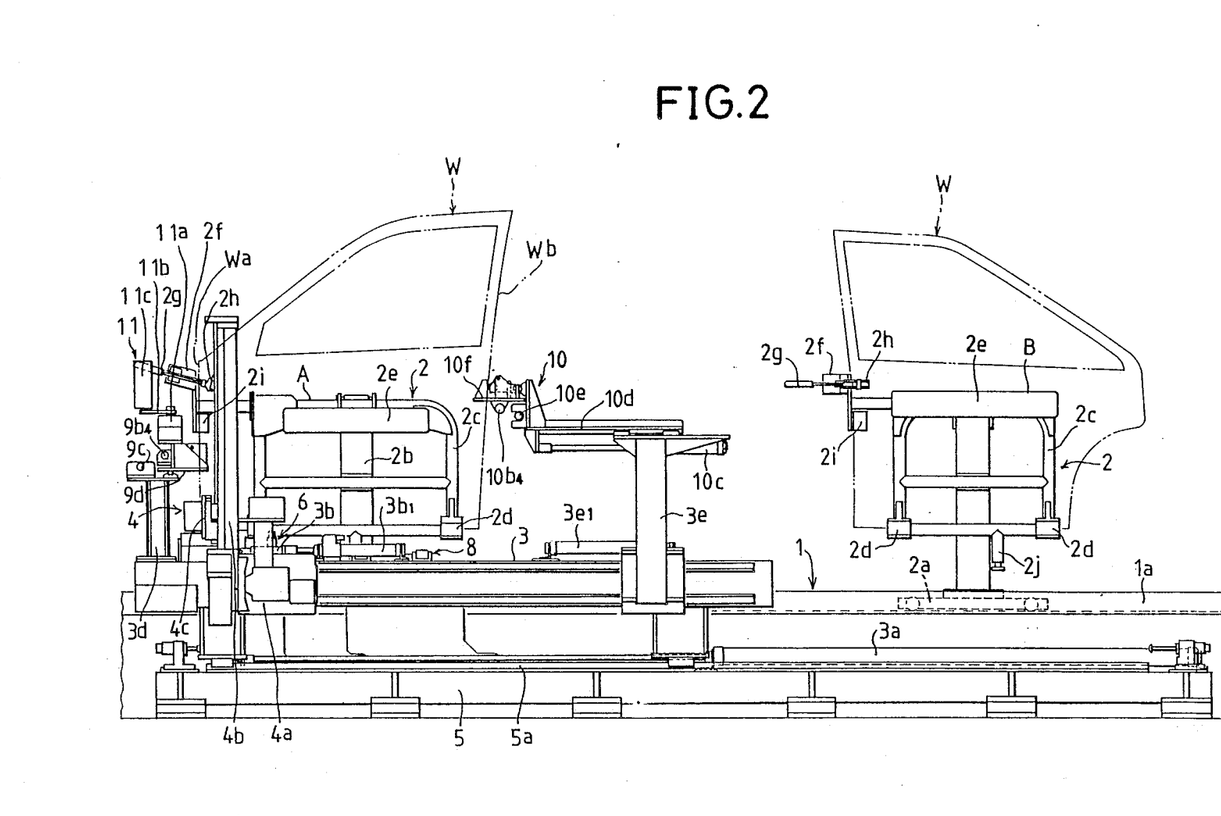
FIG. 2 is a front view thereof.

Referring to FIGS. 1 and 2, a conveyor 1 alternately conveys a front door W and a rear door W each carried on a carrier 2, the carrier for the front door being designated A in the drawing and the carrier for the rear door being designated B. A movable base 3 movable in the longitudinal direction which is parallel to the direction in which the door W is conveyed is provided alongside of the conveyor 1. A robot 4 for the sealing operation is mounted on the movable base 3 so as to apply a sealing agent to the door W being conveyed.

The robot 4 is a 3-axis rectangular coordinate type robot comprising a robot body $4a$ supported longitudinally movably on the movable base 3, a lift frame $4c$ assembled to the robot body $4a$ through a laterally movable column $4b$, and a sealing agent applicator nozzle $4d$ attached to the lift frame $4cd$.

Figure 3:
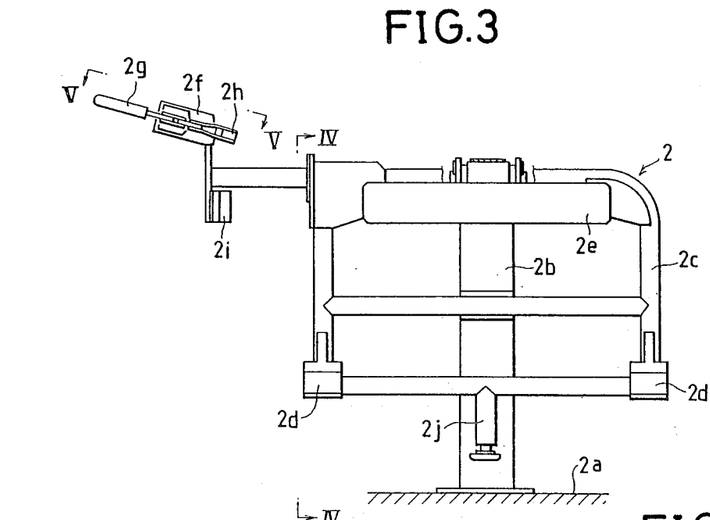
FIG. 3 is a front view of the carrier.
Figure 4:
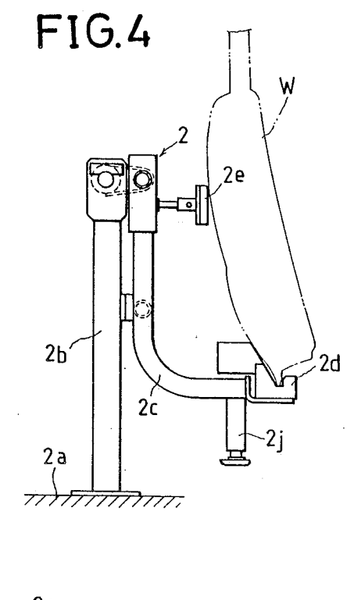
FIG. 4 is a side view of the carrier taken along the line IV—IV in FIG. 3.
Figure 5:
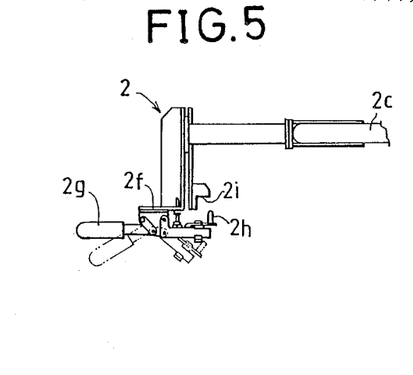
FIG. 5 is a top plan view taken along the line V—V in FIG. 3.

The carrier 2 comprises a carrier base $2a$ moved along a pair of left and right rails $1a$, $1a$ of the conveyor 1, a support $2b$ erected on the carrier base $2a$, and a carrier frame $2c$ provided on the support $2b$ for holding the door W upright as shown in FIGS. 3 and 4. More in detail, the carrier frame $2c$ is provided at its lower end with a pair of front and rear workpiece receivers $2d$, $2d$ designed to receive the lower edge of the door W and at its upper end with a longitudinal extending holder plate $2e$ adapted to abut on the outer panel of the door W so that the door W can be mounted on the carrier frame $2c$ while being held in an upright posture with its inner panel positioned to face laterally outward. In addition, a bracket $2f$ provided on the upper end of the carrier frame $2c$ rearwardly in the conveying direction is as shown in FIG. 5 provided with a work clamper $2h$ operated to open and close by operation of a handle $2g$ and further with a seat $2i$ located therebelow so as to prevent the door from falling off.

Furthermore, in order to permit the posture of the door W to be changed at another step of operation than the sealing step, the carrier frame $2c$ is attached to the support $2b$ in such a manner as to be suspended therefrom and swingable with respect thereto and is further provided at the middle of its lower end with a guide member $2j$ for changing the posture.

As shown in FIGS. 6 through 9, the movable base 3 is mounted on a pair of guide rails $5a$, $5a$ fixedly attached to a base frame 5 extending in the longitudinal direction in such a manner that the movable base 3 may be slidably movable along the guide rails $5a$ in the longitudinal direction and returned to a standby position on the rear side by a return cylinder $3a$. The robot 4 is mounted on the movable base 3 as described in the foregoing and the movable base 3 is further provided with a clamping means 6 for clamping the carrier 2 and with a positioning means for positioning the door W on the carrier 2 with respect to the orthogonal directions including the longitudinal, vertical and lateral ones.

The clamping means 6 comprises: a front-side stopper pin $6b$ provided on a first slide plate $3b$ so as to be moved vertically by a cylinder $6a$ toward the movement track of the workpiece receiver $2d$ of the carrier 2, the first slide plate $3b$ being provided at a portion close to the rear end (the extreme right end in FIG. 6) of the side surface of the movable base 3 facing the conveyor side, that is, the inward-facing surface of the movable base 3, in such a manner that it may be moved by a cylinder $3b1$ in the longitudinal direction; and a rear-side clamp arm $6d$ provided also on the first slide plate $3b$ and operated by a cylinder $6c$ to rise and fall. When the workpiece receiver $2d$ at the front end of the carrier 2 is moved to be in front of the stopper pin $6b$, the guide member $2j$ provided on the carrier 2 comes in contact with a limit switch $7_1$ attached to the conveyor rail $1a$ to cause the stopper pin $6b$ to move upwards with signals from the limit switch $7_1$. With subsequent forward movement of the carrier 2, the workpiece receiver $2d$ at the rear end thereof comes in contact with the stopper pin 6b and this contact is detected by a proximity switch 7₂ attached to the stopper pin 6b. With signals from the proximity switch 7hd 2, the clamp arm 6d is operated to rise, so that the rear-end work piece receiver 2d is clamped between the stopper pin 6b and the clamp arm 6d.

Figure 6:
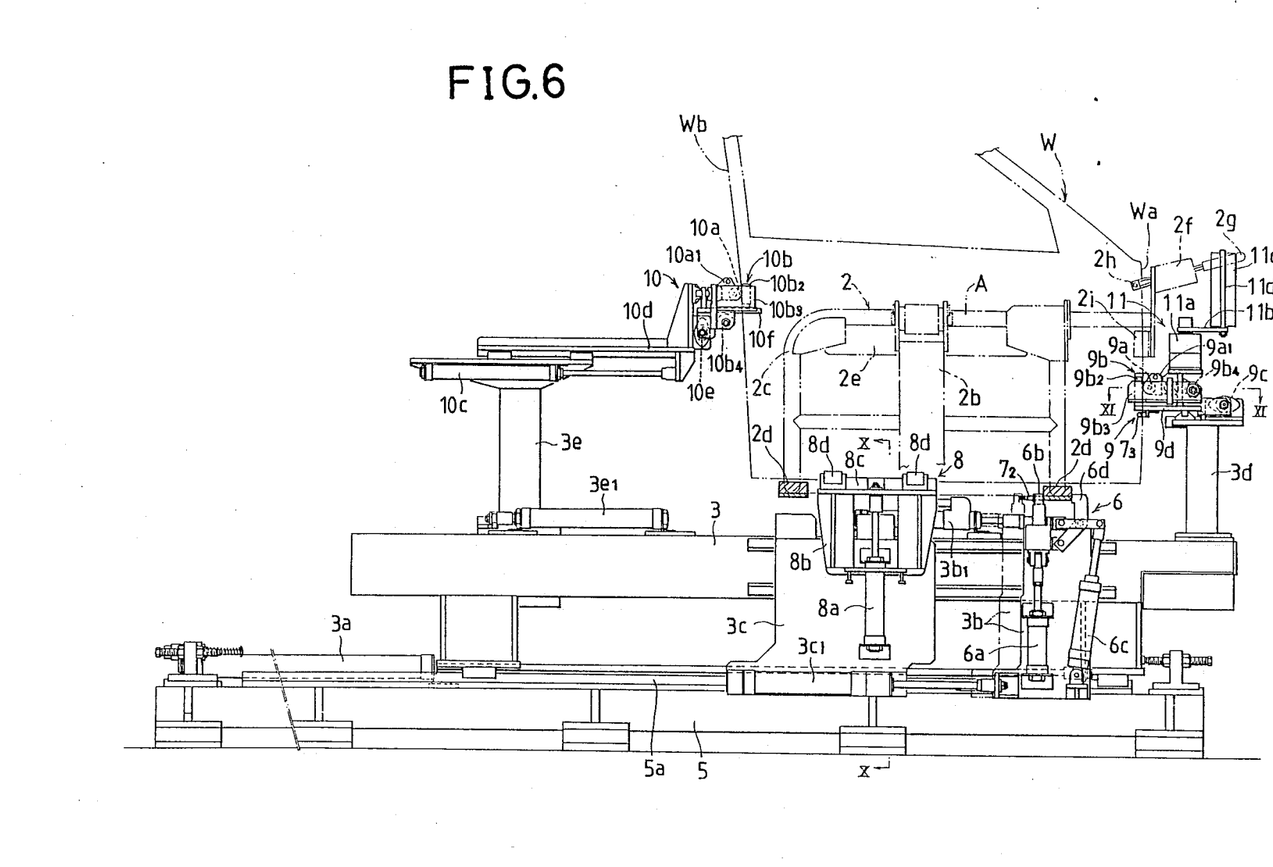
FIG. 6 is a front view of the movable base as seen from the conveyor side.
Figures 7, 10, 11:
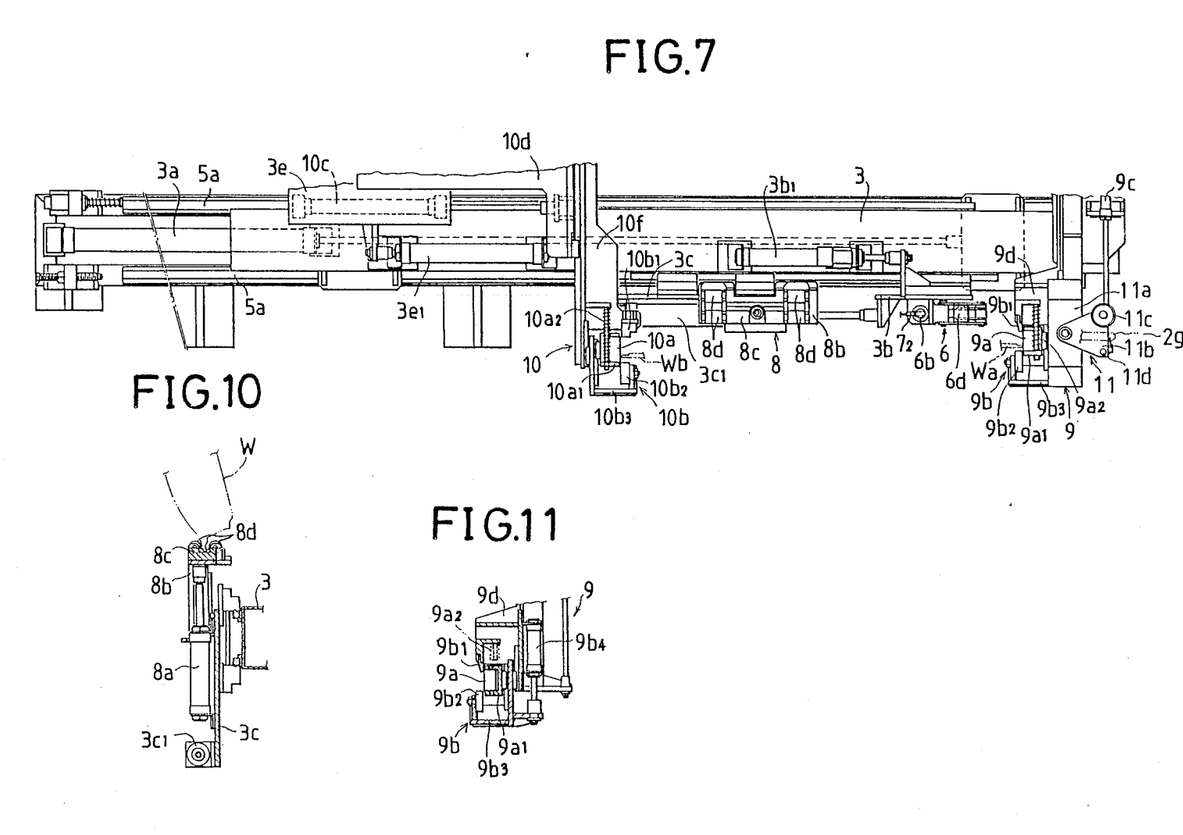
FIG. 7 is a tope plan view thereof.
FIGS. 10 and 11 are sectional views taken along the lines X—X and XI—XI respectively in FIG. 6.
Figure 8:
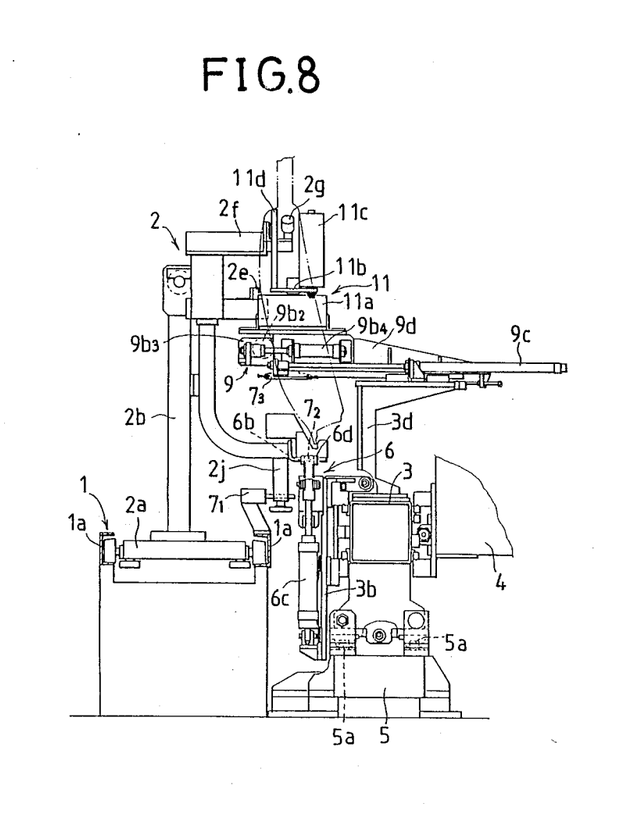
FIG. 8 is a right side view of the movable base shown in FIG. 6.
Figure 9:
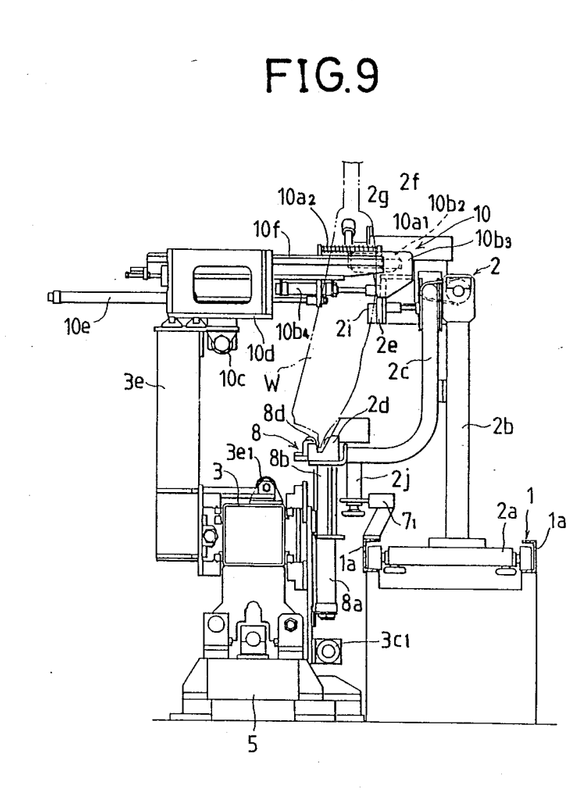
FIG. 9 is a left side view of the movable base shown in FIG. 6.

The positioning means comprises a lifter 8 to push the door W up from below to a predetermined position, a first unit 9 having a reference seat 9a for receiving a side edge located rearwardly of the door W with respect to the conveying direction of the door W and a first clamp means 9b for clamping the rearward side edge Wa from sideward direction, and a second unit 10 having an abutment seat 10a for contacting a side edge Wb located frontwardly of the door W with respect to the conveying direction of the door W and a second clamp means 10b for clamping the front side edge Wb from sideward direction. More in detail, the lifter 8 is, as shown in FIGS. 6 and 10, arranged to comprise a lift frame 8b so mounted on a second slide plate 3c as to be liftable by a cylinder 8a, the second slide plate 3c being mounted at a portion in front of the clamp means 6 on the inward-facing side surface of the movable base 3 in such a manner that its position may be changed over by a cylinder 3c1 in the longitudinal direction with respect to the clamp means 6 according to types of the door W, a receiving seat 8c for receiving the lower edge of the door W on the upper surface of the lift frame 8b, and guide rollers 8d provided at the front and rear ends of the receiving seat 8c for guiding the lower edge of the door W, so that an upward movement of the lift frame 8b causes the receiving seat 8c to move up to contact the lower edge of the door W and push it up further to the predetermined position.

The foregoing first unit 9 is arranged to further comprise a cylinder 9c, and a first slide frame 9d so mounted on the support 3d erected at the rear end of the movable base 3 that it may be moved by the cylinder 9c in the laterally inward direction toward and away from the conveyor 1 side. It is further arranged such that, as shown in FIG. 11, a holder 9a1 pivotally supporting the reference seat 9a comprising a roller is supported at the front end portion of the first slide frame 9d in such a manner as to be laterally outwardly slidable against a spring 9a2 while the first clamp means 9b comprises an outer receiving seat 9b1 and an inner clamp roller 9b2 which face each other laterally over the rearward side edge Wa of the door W located therebetween. The inner roller 9b2 is put in and out of contact with the receiving seat 9b1 by the operation of a clamp cylinder 9b4 connected to a holder 9b3 which pivotally supports the inner roller 9b2, so that when the roller 9b2 is moved toward the receiving seat 9b1, the rearward side edge Wa of the door W together with the reference seat 9a is pushed toward the receiving seat 9b1 side and the rearward side edge Wa is clamped sideward using the receiving seat 9b1 as a lateral positioning reference.

The foregoing second unit 10 is arranged to further comprise a second slide frame 10d so mounted on the upper surface of a support 3e that it can be moved back and forth in the longitudinal direction by a cylinder 10c, and a third slide frame 10f mounted on the second slide frame 10d so that it can be moved laterally inwardly toward and away from the conveyor 1 by a cylinder 10e, the support 3e being mounted at a portion closer to the rear end of the outward-facing lateral side surface of the movable base 3 in such a manner that its position may be changed over by a cylinder 3e1 in the longitudinal direction according to types of the door W. It is further arranged such that a holder 10a1 which pivotally supports the abutment seat 10a comprising a roller is supported at the front end portion of the third slide frame 10f in such a manner as to be laterally outwardly slidable against a spring 10a2 while the second clamp means 10b comprises an outer receiving seat 10b1 and an inner clamp roller 10b2 which face each other laterally over the front side edge Wb of the door W located therebetween. As is the clamp roller 9b2 of the foregoing first unit 9, this clamp roller 10b2 is also put in and out of contact with the receiving seat 10b1 by the operation of a clamp cylinder 10b14 connected to a holder 10b3 thereof so that the front side edge Wb of the door W may be clamped sideward as the roller 10b2 moves closer to the receiving seat 10b1.

It should be noted that an operating means 11 is mounted on the first slide frame 9d of the first unit 9 for operating the work clamper 2h provided on the carrier 2. More in detail, the operating means 11 comprises a rotary actuator 11a provided on the upper surface of the front-end portion of the first slide frame 9d, a rotatable plate 11b rotated by the rotary actuator 11a, and a roller 11c and a bar 11d which are erected on the rotary plate 11b in such a manner as to hold the handle 2g of the work clamper 2h therebetween from both sides in the lateral direction, so that the work clamper 2h may be opened as indicated by imaginary lines in FIG. 5 when the rotary plate 11b is rotated counterclockwise from the state shown in FIG. 7.

In addition, the first slide frame 9d is provided with a photoelectric tube switch 7₃ which detects a positional relationship between the rearward side edge of the door W and the reference seat 9a in which the former comes in contact with the latter.

Operation of this embodiment of the present invention will now be explained in the following:

When the carrier 2 is moved forward by the conveyor 1 and advanced into a location facing the movable base 3 present at the standby position, the limit switch 7₁ first detects the carrier 2 to cause the stopper pin 6b of the clamping means 6 to move upward. Then, when the workpiece receiver 2d at the lower rearward end of the carrier 2 comes in contact with the stopper pin 6b, this contact is detected by the proximity switch 7₂ and the clamp arm 6d is caused to rise, so that the workpiece receiver 2d is clamped between the stopper pin 6b and the clamp arm 6d and thereafter the movable base 3 that follows the carrier 2 is moved forward.

The clamping means 6 is initially moved to and kept at the front position indicated by imaginary lines in FIG. 6. After clamping the workpiece receiver 2d, the first unit 9 is advanced laterally inwardly by movement of the first slide frame 9d. Then, the clamping means 6 is moved toward the first unit 9, that is, rearwardly, by movement of the first slide plate 3b. According to this operation, the movable base 3 is moved forward with respect to the carrier 2 by reaction force of movement of the clamping means 6. The first unit 9 which has been advanced in the rearward of the rearward side edge Wa of the door W leaving some space therefrom so as not to interfere with the door W is then moved closer to the rearward side edge Wa. Then the handle 2g of the work clamper 2h provided on the carrier 2 is inserted between the roller 11c and bar 11d of the operating means 11 mounted on the first slide frame 9a of the first unit 9.

Thereafter, when the reference seat 9a of the first unit 9 comes in contact with the rearward side edge Wa of the door W, this contact is detected by the photoelectric tube switch 7₃ to stop further movement of the clamping means 6. Next, the second unit 10 is advanced laterally inwardly by movement of the third slide frame 10f and then the rotary plate 11b of the operating means 11 is rotated to open the work clamper 2h, after which the second unit 10 is moved rearward by movement of the second slide frame 10d. According to the foregoing, the abutment seat 10a of the second unit 10 comes in contact with the front side edge Wb of the door W to have the door W clamped between the abutment seat 10a and the reference seat 9a, so that the door W is positioned longitudinally with respect to the movable base 3 according to the reference seat 9a taken as the positional reference.

Next, the lift frame 8b of the lifter 8 is moved upward and at the same time the clamp rollers 9b1 and 10b2 of the first and second clamp means 9b and 10b provided respectively on the first and the second units 9 and 10 are moved toward the receiving seats 9b1 and 10b1. According to this operation, the door W is pushed upward by the lifter 8 to the predetermined position so as to be positioned vertically while both the front and rearward side edges of the door W are clamped sideward by the first and second clamp means 9b and 10b so as to be positioned laterally, so that the door W is properly positioned in three orthogonal directions including the longitudinal, vertical and lateral directions and held in that position. After this is done, the robot 4 mounted on the movable base 3 is operated to apply a sealing agent to the door W. After having applied the sealing agent, the foregoing procedures are reversed to release the door W from being positioned with respect to the movable base 3 and, after mounting the door W on the carrier 2, the work clamper 2h is closed. Then, after the clamping means 6 is moved forward with respect to the movable base 3, the carrier 2 is released from its clamped position. Thereafter, the movable base 3 is returned by the return cylinder 3a to the rearward standby position to complete one cycle of operation.

A type-of-door identification apparatus (not shown) is disposed in front of the position where the movable base 3 is disposed, so that position of the second slide plate 3c supporting the lifter 8 and that of the support 3e supporting the second unit 10 are changed over with signals from the identification apparatus according to type of the door W in order to be able to automatically deal with changes in type of the door W.

As apparent from the foregoing description, according to the invention since the workpiece can be positioned in three orthogonal directions with respect to the movable base and supported in that position even when the work is not so mounted on the carrier as to be positioned specifically thereon, the predetermined working can be performed accurately to the workpiece by the robot mounted on the movable base while the workpiece is being conveyed by the conveyor. Therefore, it is not necessary to provide the carrier with a special positioning member.

This brings about not only reduction in equipment cost per carrier but also increased work efficiency with respect to setting in position of the workpiece, thus contributing remarkably to improvement of productivity.

Further, according to the invention the plate-like workpiece mounted in an upright posture on the carrier can be accurately positioned by the structurally simple arrangement in three orthogonal directions including the vertical, longitudinal and lateral directions with respect to the movable base. In addition, according to the invention even when the reference seat serving as a reference for longitudinally positioning the workpiece is set longitudinally stationary with respect to the movable base in order to increase the positioning accuracy, there can be obtained a greater range of tolerance for longitudinal positional deviation of the work with respect to the carrier so that the frequency of occurrence of production line stoppage due to faulty positioning of the work piece can be minimized.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. In a working method for a workpiece being conveyed wherein a movable base is provided alongside of a conveyor conveying a workpiece mounted on a carrier which is movable in the longitudinal direction in which said workpiece is conveyed, and a robot mounted on the movable base is used to apply predetermined working to the workpiece being conveyed by the conveyor, an improvement comprising the steps of:
   carrying out successively: detecting the carrier, clamping the carrier by a clamping means provided on the movable base, and positioning the workpiece on the carrier by a positioning means provided on the movable base in three orthogonal directions with respect to the movable base and holding the workpiece in that position; and
   thereafter operating the robot.

2. A working apparatus for a workpiece being conveyed wherein a movable base is provided alongside of a conveyor conveying a workpiece mounted on a carrier which is movable in the longitudinal direction in which said workpiece is conveyed, and a robot mounted on the movable base is used to apply predetermined working to the workpiece being conveyed by the conveyor, said apparatus further comprising:
   a clamping means for clamping the carrier, said clamping means being provided on the movable base and operated by signals from a detecting means that detects the carrier; and
   a positioning means, which is also provided on the movable base, for positioning the work piece on the carrier in three orthogonal directions with respect to the movable base and holding the workpiece in that position.

3. A working apparatus for a work being conveyed wherein a movable base is provided alongside of a conveyor conveying a plate-like workpiece mounted on a carrier in such a manner that the workpiece is held in an upright posture with its side surfaces facing sideward, said movable base being movable in the longitudinal direction in which the work piece is conveyed, and a robot mounted on the movable base is used to apply predetermined working to the workpiece being conveyed by the conveyor, said apparatus further comprising:
   a clamping means for clamping the carrier, said clamping means being provided on the movable base and operated by signals from a detecting means that detects the carrier; and a positioning means, which is also provided on the movable base, for positioning the workpiece on the carrier in three orthogonal directions with respect to the movable base and holding the workpiece in that position, said positioning means comprising a vertically movable lifter for pushing the workpiece up from below to a predetermined position, a first unit having a reference seat for receiving one of the front and rearward side edges of the workpiece and a first clamp member for clamping said one side edge from sideward direction and a second unit having an abutment seat for contacting the other of the front and rearward side edges of the workpiece and a second clamp member for clamping said other side edge from sideward direction, said first unit being mounted on the movable base to be movable laterally toward and away from the conveyor and said second unit being also mounted on the movable base to be movable laterally toward and away from the conveyor and additionally movable in the longitudinal direction.

4. A working apparatus as claimed in claim 3, wherein the clamping means is provided on the movable base to be movable longitudinally toward and away from the first unit.

* * * * *